United States Patent Office 3,364,252
Patented Jan. 16, 1968

3,364,252
3-O-(N,N-DISUBSTITUTED-)-CARBAMOYL-GLYCYRRHETINIC ACIDS
John Cameron Turner, West Wickham, England, assignor to Biorex Laboratories Limited, London, England
No Drawing. Filed Sept. 29, 1965, Ser. No. 491,379
Claims priority, application Great Britain, Oct. 5, 1964, 40,462/64
2 Claims. (Cl. 260—482)

The present invention is concerned with new and useful derivatives of glycyrrhetinic acid and, more particularly, is concerned with 3-O-(N,N-disubstituted-)-carbamoyl-glycyrrhetinic acid derivatives and with the preparation thereof.

It is an object of the present invention to provide new and useful glycyrrhetinic acid derivatives which possess unexpectedly useful pharmacological properties of a degree of activity which could not have been predicted from knowledge of their chemical structure.

The glycyrrhetinic acid derivatives according to the present invention are those which conform to the general formula:

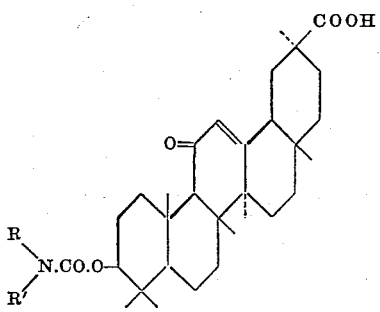

wherein R and R', which may be the same or different, are alkyl radicals containing up to 6 carbon atoms, such as methyl, ethyl, n-propyl, isobutyl and n-hexyl radicals, said alkyl radicals preferably being substituted by halogen atoms, such as chloromethyl, 2-chloroethyl, 3-chloro-n-propyl, 3-bromo-1-methyl-propyl, 4-bromo-n-pentyl and 6-chloro-n-hexyl radicals.

The new compounds according to the present invention can be prepared by reacting glycyrrhetinic acid in an inert anhydrous medium, in the presence of an acid-binding agent, with a carbamoyl chloride of the general formula:

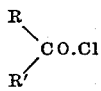

in which R and R' have the same meanings as above.

The reaction is preferably carried out at room temperature or at a slightly elevated temperature, i.e., up to about 40° C.

As acid-binding agent, it is preferred to use a tertiary base and, when the base is liquid, it is possible to omit the inert anhydrous medium and to carry out the reaction in an excess of the base. As examples of bases for this purpose, there may be mentioned triethylamine and pyridine.

The carbamoyl chlorides used as starting materials are either known compounds or can be prepared by methods analogous to those used for the preparation of the known compounds (cf. Ward, J.A.C.S., 57, 914/1935; Childs et al., J.C.S., 1948, 2174).

The preparation of the new compounds according to the present invention, starting from the appropriate secondary amine hydrochloride, is illustrated by the following equation:

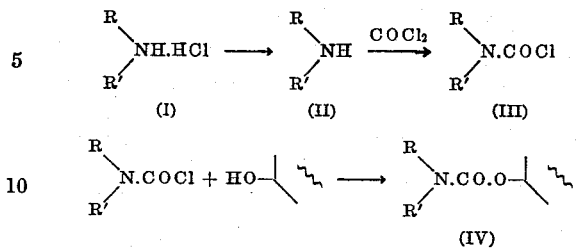

in which R and R' have the same meanings as above.

The new compounds according to the present invention have interesting pharmacological properties and have a very good anti-inflammatory action.

The following examples are given for the purpose of illustrating the present invention:

Example 1.—Preparation of di-(2-chloroethyl)-amine (II)

50 g. di-(2-chloroethyl)-amine hydrochloride (I) (M.P. 216° C.; cf. Ward, loc. cit.) were dissolved in 60 cc. cold water and shaken in a separating funnel with successive quantities of benzene (approximately 800 cc. in all), with the addition of quantities of ice cold potassium hydroxide solution (a total of 16 g. potassium hydroxide in 30 cc. water; the theoretical amount of potassium hydroxide is 15.7 g.). The benzene extracts were combined and dried over anhydrous magnesium sulphate. The benzene solution of di-(2-chloroethyl)-amine obtained was used for the next stage without isolation or further working up.

Example 2.—Preparation of di-(2-chloroethyl)-carbamoyl chloride (III)

The benzene solution of di-(2-chloroethyl)-amine, obtained as described in Example 1, was added over the course of half an hour to a solution of phosgene obtained by bubbling phosgene in 200 cc. toluene, the temperature during the addition not being allowed to rise above 10° C. The reaction mixture was left to stand overnight and then the precipitate of di-(2-chloroethyl)-amine hydrochloride formed as a by-product was filtered off. The filtrate was distilled under reduced pressure to remove the benzene and toluene and the residue of di-(2-chloroethyl)-carbamoyl chloride was used for the next stage without further working up or purification.

Example 3.—Preparation of 3-O-[di-(2-chloroethyl)-carbamoyl]-glycyrrhetinic acid 30 g. glycyrrhetinic acid were dissolved in 100 cc. dry pyridine and the di-(2-chloroethyl)-carbamoyl chloride prepared in Example 2 added thereto. The reaction mixture was placed in a stoppered flask and left to stand overnight. A crop of crystals of pyridine hydrochloride which had formed, were filtered off and the reaction mixture left to stand over the weekend. Since no further precipitation occurred, it was concluded that the reaction had reached completion after about 24 hours. The reaction mixture was poured into an excess of dilute hydrochloric acid and the resultant gum kneaded until it became granular. The material was then recrystallised twice from methanol. 17 g. 3-O-[di-(2-chloroethyl)-carbamoyl]-glycyrrhetinic acid were obtained in the form of needles with a melting point of 173° C. (decomp.);

$$[\alpha]_D^{20} = +121 \pm 1°$$

(c.=1% in chloroform).

The compound is insoluble in water, somewhat soluble in diethyl ether and soluble in methanol, ethanol, chloroform, carbon tetrachloride and benzene. The compound becomes discoloured upon prolonged heating at or above 80° C., although decomposition seems to be slight. The compound is hydrolysed by strong alkalies.

The present invention further includes within its scope pharmaceutical compositions which comprise one or more of the new compounds according to the present invention with a significant amount of a pharmaceutical carrier. The invention includes especially such compositions made up for oral, rectal or parenteral administration.

Solid compositions for oral administration include compressed tablets, pills, dispersible powders and granules. In such solid compositions, one or more of the new compounds according to the present invention is or are admixed with at least one inert diluent, such as calcium carbonate, potato starch, alginic acid or lactose. The compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also contain adjuvants, such as wetting and suspending agents, and sweetening and flavouring agents.

The compositions according to the present invention for oral administration include capsules of absorbable material, such as gelatine, containing one or more of the new active compounds according to the present invention, with or without the addition of diluents or excipients.

Preparations according to the present invention for parenteral administration include sterile aqueous or non-aqueous solutions, suspensions and emulsions. Examples of non-aqueous solvents or suspending media are propylene glycol, polyethylene glycol, vegetable oils, such as olive oil, and injectable organic esters, such as ethyl oleate. These compositions may also contain adjuvants, such as wetting, emulsifying and dispersing agents. They may be sterilised by, for example, filtration through a bacteria-retaining filter, by incorporation in the compositions of sterilising agents, by irradiation or by heating. They may also be produced in the form of sterile solid compositions, which can be dissolved in sterile water or some other sterile injectable medium immediately before use.

The percentage of active ingredient in the compositions according to the present invention may be varied, it being necessary that it should constitute a proportion such that a suitable dosage for the therapeutic effect desired shall be obtained. Obviously, several unit dosage forms may be administered at about the same time. In general, the preparations should contain between 0.1 and 10 mg. per kilogram of weight of the subject to be treated. The preparations according to the present invention should normally be administered so as to give, in the case of oral administration, 20 to 500 mg. of active substance per day and, in the case of parenteral administration, 10 to 400 mg. of active substance per day.

The following example illustrates a pharmaceutical composition according to the present invention:

*Example 4*

150 mg. tablets are prepared containing:

| | Mg. |
|---|---|
| 3 - O - [di-(2-chloroethyl)-carbamoyl]-glycyrrhetinic acid | 25 |
| Starch | 120 |
| Magnesium stearate | 5 |

I claim:
1. Glycyrrhetinic acid derivatives of the general formula:

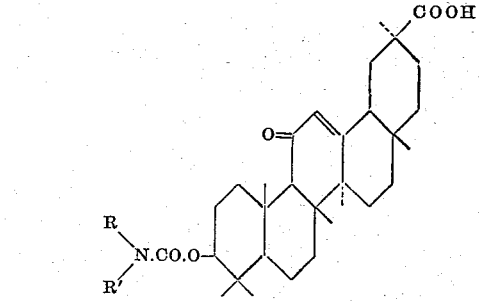

wherein R and R', which may be the same or different, are alkyl radicals containing up to 6 carbon atoms which may be substituted by halogen atoms.

2. 3-O-[di-(2-chloroethyl) - carbamoyl]-glycyrrhetinic acid.

References Cited

UNITED STATES PATENTS 3,084,185   4/1963   Gottfried et al. _____ 260—488

OTHER REFERENCES

Finney et al., J. Pharm. and Pharmacol., vol. 10, pp. 613–20 (1958).

LORRAINE A. WEINBERGER, *Primary Examiner.*

A. P. HALLUIN, *Assistant Examiner.*